US011415801B2

(12) United States Patent
Nohara

(10) Patent No.: US 11,415,801 B2
(45) Date of Patent: Aug. 16, 2022

(54) PERSONAL ELECTRONIC TARGET VISION SYSTEM, DEVICE AND METHOD

(71) Applicant: ACCIPITER RADAR TECHNOLOGIES INC., Fonthill (CA)

(72) Inventor: Timothy J. Nohara, Fenwick (CA)

(73) Assignee: ACCIPITER RADAR TECHNOLOGIES INC., Ontario (CA)

(*) Notice: Subject to any disclaimer, the term of this patent is extended or adjusted under 35 U.S.C. 154(b) by 0 days.

(21) Appl. No.: 15/457,578

(22) Filed: Mar. 13, 2017

(65) Prior Publication Data

US 2017/0184858 A1 Jun. 29, 2017

Related U.S. Application Data

(63) Continuation of application No. 13/356,872, filed on Jan. 24, 2012, now Pat. No. 9,625,720.

(51) Int. Cl.
*G02B 27/01* (2006.01)
*G01S 7/04* (2006.01)
(Continued)

(52) U.S. Cl.
CPC .......... *G02B 27/0172* (2013.01); *G01S 7/04* (2013.01); *G01S 13/42* (2013.01); *G01S 13/88* (2013.01);
(Continued)

(58) Field of Classification Search
CPC .................................................... G02B 27/017
See application file for complete search history.

(56) References Cited

U.S. PATENT DOCUMENTS 2,444,770 A  7/1948 Fyler
2,444,771 A  7/1948 Fyler
(Continued)

FOREIGN PATENT DOCUMENTS

EP  0033059 A2  8/1981
GB  2176073 A  12/1986
(Continued)

OTHER PUBLICATIONS

"Find My Friends" iTunes Preview. http://wikipedia.org/wik/Find_my_Friends, Oct. 12, 2011.
(Continued)

*Primary Examiner* — William Boddie
*Assistant Examiner* — Bipin Gyawali
(74) *Attorney, Agent, or Firm* — R. Neil Sudol; Henry D. Coleman

(57) ABSTRACT

A personal, electronic target vision system renders targets in the field of view of the user in real-time so that the user can visualize where the targets are relative to him, in an orientation analogous to unaided human vision. An electronic vision device exchanges target selection information with a target vision server which returns to the electronic vision device the corresponding selected target location information for rendering selected targets in accordance with the user's changing viewpoint. The target vision server queries a target information server in order to access, filter and provide the real-time target location information required by the electronic vision device. A surveillance system of sensors and target tracking systems provides the target information server with target location information.

52 Claims, 7 Drawing Sheets

(51) Int. Cl.
 G01S 13/88 (2006.01)
 G01S 13/42 (2006.01)

(52) U.S. Cl.
 CPC ....... *G02B 27/017* (2013.01); *G02B 27/0189* (2013.01); *G02B 2027/014* (2013.01)

(56) References Cited

U.S. PATENT DOCUMENTS

| | | | |
|---|---|---|---|
| 2,497,913 A | 2/1950 | Rines | |
| 2,519,397 A | 8/1950 | Ranger | |
| 2,597,348 A | 5/1952 | Longacre et al. | |
| 2,624,874 A | 1/1953 | Rines | |
| 2,822,537 A | 2/1958 | Bartelink | |
| 2,946,996 A | 7/1960 | Wassell | |
| 3,070,795 A | 12/1962 | Chambers | |
| 3,072,903 A | 1/1963 | Meyer | |
| 3,214,755 A | 10/1965 | Blass et al. | |
| 3,267,270 A | 8/1966 | Smidowicz | |
| 3,267,271 A | 8/1966 | Kindle | |
| 3,274,593 A | 9/1966 | Varela | |
| 3,448,450 A | 6/1969 | Alfandari et al. | |
| 3,697,990 A | 10/1972 | Emch | |
| 3,778,827 A | 12/1973 | Strenglein | |
| 3,971,020 A | 7/1976 | Howard | |
| 4,150,378 A | 4/1979 | Barton | |
| 5,254,999 A | 10/1993 | Lee | |
| 5,278,564 A | 1/1994 | Groenenboom | |
| 5,585,813 A | 12/1996 | Howard | |
| 5,663,720 A | 9/1997 | Weissman | |
| 5,848,378 A | 12/1998 | Shelton et al. | |
| 5,923,285 A | 7/1999 | Andrusiak et al. | |
| 5,971,580 A | 10/1999 | Hall et al. | |
| 6,211,814 B1 | 4/2001 | Benjamin et al. | |
| 6,249,241 B1 | 6/2001 | Jordan et al. | |
| 6,832,156 B2 | 12/2004 | Farmer | |
| 6,985,837 B2 | 1/2006 | Moon et al. | |
| 7,016,772 B2 | 3/2006 | Yanagl | |
| 7,129,887 B2 | 10/2006 | Mitchell | 342/36 |
| 9,213,405 B2 * | 12/2015 | Perez | G02B 27/017 |
| 11,201,867 B1 * | 12/2021 | Jiang | G06Q 20/102 |
| 2003/0025629 A1 | 2/2003 | Barrock et al. | |
| 2003/0028293 A1 | 2/2003 | Jankowiak et al. | |
| 2003/0220989 A1 * | 11/2003 | Tsuji | G06F 16/9574 |
| | | | 707/E17.12 |
| 2007/0018887 A1 * | 1/2007 | Feyereisen | G01C 23/00 |
| | | | 342/176 |
| 2007/0217288 A1 * | 9/2007 | Barry | G08G 5/0082 |
| | | | 367/136 |
| 2010/0106411 A1 * | 4/2010 | Nirhamo | G01C 21/3679 |
| | | | 701/533 |
| 2010/0240988 A1 | 9/2010 | Varga et al. | |
| 2011/0109747 A1 | 5/2011 | Forrester et al. | 348/152 |
| 2011/0115671 A1 * | 5/2011 | Sweet, III | G01C 21/20 |
| | | | 342/357.31 |
| 2011/0202799 A1 | 11/2011 | Huston | |
| 2011/0282799 A1 | 11/2011 | Huston | 705/319 |
| 2012/0035726 A1 * | 2/2012 | Gross | A61F 2/1624 |
| | | | 623/6.63 |
| 2012/0120499 A1 | 5/2012 | Harrison et al. | |
| 2012/0146850 A1 | 6/2012 | Liu et al. | 342/357.42 |

FOREIGN PATENT DOCUMENTS

| | | |
|---|---|---|
| GB | 2465280 A | 5/2010 |
| JP | 02290990 | 12/1990 |
| JP | 63 215983 | 9/1998 |
| JP | 63-215983 | 9/1998 |
| WO | WO 2011/129740 A1 | 10/2011 |
| WO | WO2011152902 A | 12/2011 |

OTHER PUBLICATIONS

"Latitude" iTunes Preview. http://wikipedia.org/wik/Google_Latitude, Feb. 4, 2009.
"Latitudie" iTunes Preview, http://itunes.apple.com/us/app/latitudie, May 28, 2011.
"Where are you? Show 'Em with Google Latitude" http://bits.blogs.nytimes.com/2009/02/04, Feb. 4, 2009.
"Norcontrol IT Wins Major U.S. Contract"; KNC News Archive; Jun. 13, 2001.
"Litton Marine Systems Introduces New-Generation Vessel Traffice System (VTS)"; Soerry Marine News & Press Releases; Jul. 28, 2000; pp. 1-5.
"Lotton Marine Systems Suppiles VTS for River Locks in Holland"; Sperry Marine News & Press Releases; Aug. 18, 2000; pp. 1-5.
Vessel Traffic Management & Information System VTMIS5060; NOR Control IT AS; 2004; pp. 1-2.
"Low-Cost Radar Surveillance of Inland Waterways for Homeland Security Applications"; Peter Weber, et al.; Apr. 26-29, 2004; pp. 1-6.
"Multiple-Target Tracking with Radar Applications"; Samuel S. Blackman; pp. 92-107, 1986.
"Affordable Avian Radar Surveillance Systems for Natural Resource Management and BASH Applications"; Tim Nohara, et a;. 2005, pp. 1-6.
Mathematical Techniques in Multisensor Data Fusion; David L. Hall; pp. 1-8, 1992.
"Maritime Safety, Security, & Surveillance." Lockheed Martin Brochure. Jan. 2003. 8 pages.
"Affordable, Real-Time 3-D Avian Radar Networks for Centralized North American Bird Advisory Systems"; Peter Weber, et al. Aug. 2005, pp. 1-8.
"Vessell Traffic Management & Information Systems Applications". Norcontrol IT AS. Aug. 2000.
"An Algorithm for Tracking Multiple Targets." Reid, Donald. IEEE Transactions on Automatic Control. vol. 24, Issue 6 Dec. 1079, pp. 843-854.
"Sicom Develops Security Radar Technology." Canadian Electronics. Nov./Dec. 2003. vol. 18, No. 7.
"IMM Algorithm for tracking targets that maneuver through coordinated turns." Proceedings of the Society of Photo-Optical Instrumentation Engineers. vol. 1698. Apr. 20-22, 1992.
"The Jindakee Operational Radar Network: Its Architectire and Surveillance Capability." IEEE 1995 Conf. May 8-11, 1995. pp. 592-697. Cameron Alex.
"Development of a Virtual Radar Environment." International GeoScience and Remote sensing Symposium. vol. 6. Jul. 9-13, 2001. pp. 2599-2601. Chandraesekar et al.
"The Haida's Last Mission." The Standard (St. Catharines-Niagra) Aug. 27, 2003, pp. A1-A2. Currie, Bill.
"HMCS Haida voyage to resting berth Hamilton, Ontario . . . tracked using newest homeland security radar technology . . . " Fonthill, Ontario. Sicom Systems Ltd. Press Rel. Aug. 2005.

* cited by examiner

PERSONAL ELECTRONIC TARGET VISION SYSTEM, DEVICE AND METHOD

FIELD OF THE INVENTION

This invention relates to devices and methods that allow an individual to visualize, through electronic means, targets of interest and their locations; and the invention also relates to cloud computing and cloud services. The invention is particularly useful for visually rendering targets in a person's field of view that are too far away to see or too difficult to find by visual observation, unaided or with an optical instrument.

BACKGROUND OF THE INVENTION

Several applications require the means for individuals to easily locate targets of interest over large geographic regions. For example, airports span thousands of acres in extent and birds approaching active runways and critical aircraft flight corridors pose a significant hazard to aviation safety. If a trained wildlife biologist can locate such birds in a timely manner and respond to them, pyrotechnics or other techniques can be used to persuade the birds to alter their course, reducing the risk of bird strikes with aircraft. Or consider law enforcement personnel patrolling vast waterways to protect against criminal activity. If suspicious or threatening target activity can be detected and if such targets can be easily located, response vessels can successfully interdict them.

However, providing response personnel with the means to easily locate such targets of interest is anything but simple. Prior art systems include sensors carried by individuals, sensors mounted on the platforms they ride on, and sensors deployed throughout the entire region of interest.

Sensors carried by individuals include binoculars, cameras and night-vision goggles. While these help improve a user's natural vision with the ability to zoom to distant targets and allowing targets to be seen at night, they are labor intensive and difficult to use when multiple targets are present over vast areas at different ranges, bearings and altitudes. Each target must be searched out, one at a time, adjusting direction and zoom factor for each one; and accurate latitude, longitude, and altitude (or azimuth, elevation, range) coordinates are generally not available. The sensor's maximum range is also limited; and at an airport, for instance, view will be blocked by urban structures such as airport terminal buildings. As a result, targets such as birds will only be seen in the vicinity of the user, unless multiple persons are deployed around the airport at all times, which is expensive. Finally, target information can not be easily shared with other remote users unless high-bandwidth network links are provided to move video, for example, from a head-mounted camera to a remote user; and multiple remote users can not independently control the user-carried sensor for their own viewing purposes.

A platform-mounted sensor such as radar mounted on an agile police vessel carrying a few police officers is also limited in performance. Line of sight coverage is limited (because of the low height above the water available for mounting the sensor) to within a few kilometers of the vessel. If the police vessel responds at night by chasing a target of interest, radar performance will severely degrade due to the impact of vessel dynamics on sensor performance, resulting in target loss. A large number of vessels with radars are needed to monitor vast water areas, making such a system extremely expensive. And the display of targets by the vessel radar is not user-centric; rather it is vessel-centric (e.g. heads-up display) or north-centric (north-up display) making it more difficult for individual users to understand their situation, and stay locked on assigned targets, especially in crowded target environments.

Radar networks have been deployed around airports and vast waterways in recent years to provide wide-area surveillance of bird and aircraft targets in the air around airports, and small vessels on the water, respectively. A common operating picture (COP) display which provides a combined, earth-coordinates view of targets as seen by the sensor network has greatly increased situational awareness to centralized operators who have a birds-eye or earth-centric view of the entire geographic area represented by a map with targets overlaid on top. While this earth-centric view is valuable to centralized operators, it is lacking for individual responders who are on the move and attempting to respond to particular targets of interest. The position and orientation of the responder is often not captured by the COP; and transforming from an earth-centric display to a user-centric display coupled with directing one's eyes to visually acquire a target of interest is difficult and non-intuitive. As a result, finding targets of interest with the aid of the COP is very challenging.

The present invention seeks to overcome the aforementioned limitations by providing and integrating new capabilities to enable users to easily visualize and locate targets of interest in a manner analogous to how their natural vision functions, using a personal electronic vision device (PEVD).

OBJECTS OF THE INVENTION

A primary object of the current invention is to provide each of multiple users with electronic target vision means to automatically detect targets of interest in his respective field of view in real-time and render them to him so that he can visualize where the targets are relative to himself, in an orientation analogous to that observed with unaided human vision or with the aid of an optical instrument.

Another object of the present invention is to provide each user with the means to define his field of view as a function of his viewing geometry, so that his field of view moves as he turns around.

Another object of the present invention is to provide the user with the means to specify his targets of interest, based on target types (e.g. aircraft or vessels) or target attributes (e.g. speed, heading, or size).

Another object of the present invention is to allow groups of users to easily and efficiently work together when searching out targets in an area of interest.

Another object of the present invention is that electronic target vision means be provided on easy-to-carry-and-use mobile devices such as smart phones and tablet PCs.

Another object of the present invention is to utilize existing target surveillance systems, where targets of interest can include aircraft, birds, planets, space objects, vessels, vehicles, animals, and persons.

Another object of the present invention is to provide a personal electronic vision system wherein users are not required to carry heavy and expensive radar or camera sensors.

Yet another object of the present invention is to provide such a personal electronic vision system wherein users are provided with historical target patterns for a particular geographic area to assist users in where to focus their attention.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention concerns a novel capability for people to gain an intuitive understanding or situational awareness of targets of interest (TOIs) in their immediate environment. TOIs are dynamic in nature (i.e., moving) and include all types of targets such as aircraft, birds, planets, space objects, vessels, vehicles, animals, and persons. The intuitive understanding is gained by enabling a perception of these targets in a manner analogous to human vision. An individual looks or orients a personal electronic target vision device in a certain direction and sees or perceives by way of a visual rendering the locations of TOIs in that direction. As the TOIs move and/or the person carrying the device moves, the visually perceptible rendering of the TOIs is updated accordingly.

The advent of cloud computing and wide-area surveillance systems as described in (i) "A Commercial Approach to Successful, Persistent Radar Surveillance of Sea, Air and Land along the Northern Border", Nohara, T. J., 2010 IEEE International Conference on Homeland Security Technologies, Waltham, Mass., 8-10 Nov. 2010; (ii) "Reducing Bird Strikes—New Radar Networks can help make Skies Safer", Nohara, T J, Journal of Air Traffic Control, Vol 51, No. 3, Summer 2009; and (iii) U.S. Pat. No. 7,940,206 entitled "Low-cost, high-performance radar networks", all of which are incorporated herein by reference, have created for the first time the motivation and opportunity to conceive, design and deploy personal target vision systems where the target sensors are not located on the user.

A personal electronic target vision system in accordance with the present invention displays targets to one or more users relative to each user's respective location. With a personal electronic vision device (PEVD) carried by a user, targets in the field of view (FOV) of each user are rendered in real-time to the user so that the user can visualize where the targets are relative to himself, with the rendering having an aspect or orientation analogous to what the user might see with his or her eyes unaided with an optical instrument such as binoculars or a telescope. Each PEVD transmits target selection information to a target vision server which returns to the PEVD the corresponding selected target location information for rendering to the user. The target selection information for a given user accounts for the user's changing view geometry so that the selected targets returned and rendered are in accordance with the user's changing viewpoint. The target vision server queries a target information server in order to access, filter and provide the real-time target location information required by each user's electronic vision device. A surveillance system, consisting of any number and types of sensors and target tracking systems, which are separate from and independent of the users, provides the target information server with target location information. System elements can reside in the Cloud accessible over the Internet and the PEVD can be implemented as a software application on a mobile device. At another end of the spectrum of possible approaches, the sensors, the target information server and the target vision server are parts of a dedicated closed or private system that may be operated by a single organization such as a port authority, a border enforcement agency, an airport, etc.

In accordance with the present invention, a real-time personal vision system comprises the following elements, which work together to provide (to varying degrees) the desired features listed above:

1. One or more personal electronic vision devices, each which connects to a target vision server over a network, either directly on a private network or over a public network such as the Internet;
2. a target vision server which connects on the one side to one or more PEVDs and on the other side to a target information server over computer networks, with any particular network segment being a private link or a public link such as the Internet;
3. a target information server which connects over computer networks on the one side to a target vision server and on the other side to a surveillance system, with any particular network segment being a private link or a public link such as the Internet; and
4. a surveillance system consisting of one or more sensors for collecting target location or track information and distributing the same over a computer network to the target information server.

The target vision server, target information server and surveillance system can each be made up of multiple, respective, target vision servers, target information servers, and surveillance systems dispersed geographically, owned by different owners, and connected over networks using methodologies known to those skilled in art. For simplicity and without loss of generality, each of these elements are referred to below in the singular, but a plurality is contemplated as well. Preferably, the surveillance system, target information server and target vision server provide target location information in earth coordinates (e.g. latitude, longitude, altitude).

The above elements can be deployed together as a single system, by a single system owner, on either private or public computer networks, or alternatively, they could be viewed as a system of systems where existing elements (e.g. a surveillance system and target information server) deployed by one owner are used or accessed by other elements (e.g. a target vision server and PEVDs) deployed by another owner. In the limiting case, the surveillance system, target information server and target vision server, in accordance with the present invention, can all exist in the Cloud and be part of Cloud infrastructure, with PEVDs simply operating by subscribing to a Cloud service. System elements can also be combined in accordance with the present invention. For example, a surveillance system and target information server can be coupled together and function together, interfacing directly to the target vision server. Another example combines the surveillance system, target information server and target vision server so that they function as a single system connected to PEVDs. These and other variations known to those skilled in the art are in accordance with the present invention.

A related method in accordance with the present invention comprises:

operating a PEVD to display to a user the whereabouts or locations of TOIs in the dynamic FOV of the user, the PEVD sending user data to a target vision server in response to changes in the user's view geometry which impact the user's FOV;

operating a target vision server which queries a target information server on behalf of the PEVD to obtain respective TOI location information and returns the selected target data to the PEVD; and operating a surveillance system which tracks targets in the coverage volume of the surveillance system and provides updates of target locations to the target information server.

It should be noted that in accordance with the present invention, the surveillance system may include surveillance sensors that are airborne or space-based as well as land-based. As used herein, land-based includes being deployed or mounted on the earth (including dry ground and water surfaces), on vehicles or vessels, and on structures that may rise into the air but are tethered to or mounted on or in contact with the earth. The land-based surveillance sensors are preferably mounted on pole-tops, towers, or on a re-locatable trailer. The surveillance may also use communication-type sensors associated with cooperative targets to track target locations. For example, automatic identification systems (AIS) for tracking large vessels and automobile GPS sensors are included among the sensors contributing to the surveillance system of the present invention.

In addition, third-party sensors can also be used to supplement or provide surveillance coverage volume including national radar networks such as NEXRAD, airport surveillance radars, automatic dependent surveillance-broadcast (ADS-B) sensors and weather radars.

Target location information generated from the various sensors making up the surveillance system can include 2D (latitude, longitude) and 3D (latitude, longitude, altitude) information, along with speed, heading, radar cross section, and various target attribute and identity information as may be available. This same information can be passed onto the PEVD in accordance with this invention to allow the user to filter TOIs to the greatest possible extent based on user preferences, enhancing user target vision and situational awareness.

A particular feature of the present invention is the user-centric view (presented on a user-centric display) provided by the PEVD, which overcomes limitations of earth-centric and vessel-centric views associated with prior art systems. Consider the case, for example, of a criminal target accompanied by decoy targets who separate and head off in different directions to confuse authorities and avoid capture. Earth-centric and vessel-centric displays can not be centered on individual targets by responding users to allow users to keep a close eye on each TOI until they are all apprehended. This is especially important because targets may be dropped and reacquired by the surveillance system that is tracking them. Users need to remain focused on all TOIs individually so if a particular target is dropped and reacquired, the users know it is the same target. In operations where a team of responders are in search of such multiple targets, the ability to assign each responder a particular target who can then be monitored by the responder's PEVD's user-centric display is valuable for increasing the probability of apprehension. Each responder can control his own PEVD to keep his assigned TOI in view. If a particular TOI is moving out of the visual display window of the PEVD, the user simply turns, with his PEVD, towards the target (just like he would with his own head/eyes) to cause the TOT to move back to the center of the display. If the TOI moves closer to or further away from the user, the user simply adjusts the zoom and/or range-setting of the PEVD to keep visual lock on the target; i.e. to keep the target within the display limits of the user-centric visual display. These abilities to turn (equivalent to pan left or right), set range interval (i.e. adjust the range window of the display which is equivalent to panning in depth, in and out) and zoom (to control the amount of display area the TOIs occupy) on each user's PEVD are novel features of the present invention.

The aforementioned turn, set-range-interval, and zoom features are also very useful when trying to search out single targets, especially if the user is moving on a platform such as a vehicle or vessel. The movement of the user introduces accelerations on the scene that would cause the TOI's to move out of the user's view without the features of the present invention. The user-centric view in accordance with the present invention makes keeping visual track of individual targets easy and intuitive, similar to looking with the unaided eye, or through an optical instrument such as binoculars or a telescope. In a preferred embodiment of the present invention, the user can select a particular TOT and have the PEVD lock on that TOI (for example, by automatically exploiting the turn, set-range-interval and zoom controls), maintaining it in the display window automatically.

Additional features in accordance with the current invention allow users to filter or select which particular targets are of interest to them for visual rendering on their PEVD. The user can restrict TOIs to a particular set of speeds, headings, radar cross sections, and any other target attribute or identity information afforded by the surveillance system. So if a user is interested in fast aircraft targets that are headed in a particular set of directions, setting speed and heading constraints on his PEVD causes only those TOIs to be displayed. Such capabilities are particularly important in dense target environments to reduce the workload of individual users and increase their effectiveness and situational awareness, based on their particular mission. Where cooperative information such as AIS target identity information is available from the surveillance system, users can even specify particular targets to be displayed whenever they are present in the FOV.

In a preferred embodiment of the present invention, the PEVD is automatically notified by the electronic target vision system about the nature of surveillance information and target attributes available in the user's vicinity, so that the user can easily select from a list of choices to indicate the types of targets he is interested in seeing, and how they should be filtered. Methods such as web services known to those skilled in the art allow the PEVD to automatically discover information availability and select preferences. Users can subscribe for different target information services, in accordance with the present invention, when such information is provided to users from service providers, using online and cloud computing commerce methods known to those skilled in the art.

The user data exchanged between the PEVD and the target vision server can vary considerably, in accordance with the present invention. User data can include any subset of information from the set consisting of user location, user view geometry (i.e. indicative of where the user looking), TOI preferences as discussed above, FOV definitions for that user, etc.; and the target vision server can apply this user data in any manner to extract and provide selected target data to the PEVD. For example, and without loss of generality, the target vision server could limit selected target data to only those targets in the user's FOV meeting all user specifications, or it could send a much broader set of selected target data to the PEVD, leaving it to the PEVD to do further filtering of the data prior to rendering to the user.

The aforementioned personal electronic target vision system in accordance with the present invention is described further below in relation to the figures which detail particular embodiments. The aforementioned and other novel features of the present invention will become apparent in the sequel.

DEFINITIONS

Figure 1:
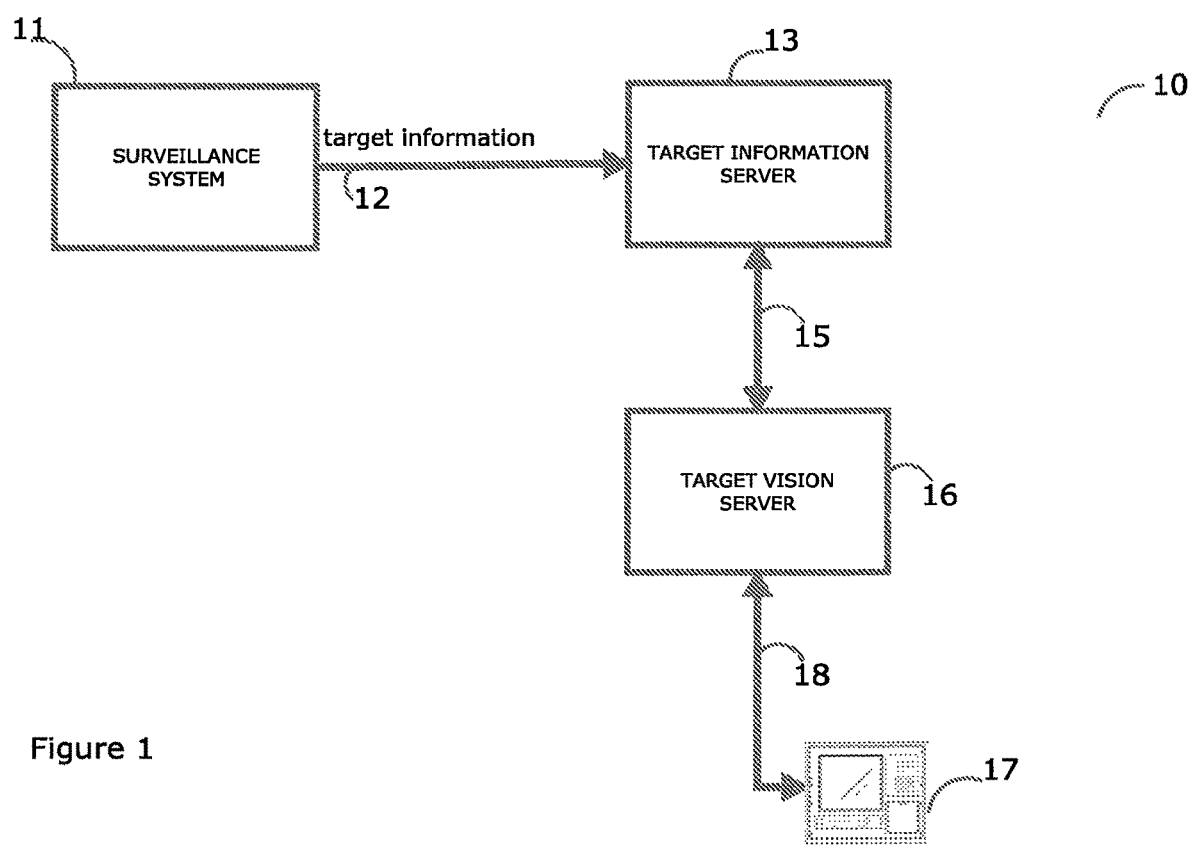
FIG. 1 is a block diagram of a personal, electronic target vision system in accordance with the present invention, with surveillance system, target information server, target vision server and personal electronic vision device shown.

The term "user-centric view" as used herein refers to a graphic representation wherein respective targets, including moving targets, that are present (or were present in the case of a historical targets) at respective locations in the vicinity of a user are displayed in an orientation relative to the user's location and look direction, and only when such respective targets are in the user's defined field of view (FOV). The user's FOV is typically defined as an angular sector centered about the user's direction of interest or look direction, which is typically the direction his eyes are pointed towards. The range-interval of interest can also be defined which denotes the distances from the user where targets should appear when present. The angular sector is typically specified by horizontal angular limits (bounded by 0 to 360°) and vertical angular limits (typically bounded by 0° to 90° when the user is on the ground but could be −90° to 90° if the user's location allows his look direction to vary from straight down below to straight up overhead); and his look direction can include both a horizontal bearing angle and a vertical elevation angle. Consider the following example. A vessel-A target is located 3 km north of a user, and a vessel-B target is located 2 km east of the user. The user and the vessels are at 0' AGL. If the user look direction is north, vessel-A is 3 km straight ahead relative to the user location and vessel-B is 2 km to the right, relative to the user location. If the FOV (centered on the look direction) has a horizontal angular sector larger than +/−90°, both vessels will appear on the user-centric view oriented as described above. If the FOV has an angular sector less than +/−90°, then only vessel-A will appear. If instead the user (i.e. his look direction) turns to the right looking east, now vessel-B will appear 2 km straight ahead and vessel-A will appear 3 km away on the left, relative to the user location, providing that a sufficiently large FOV is defined, otherwise, only vessel-B will appear. This two-dimensional example can be extended to three dimensions in a straight-forward manner.

The term "PEVD" as used herein refers to a personal electronic vision device carried or worn by a user that presents to the user, user-centric views of targets of interest that appear in the vicinity of the user. Such presentation includes near-real-time views showing the current location of targets as well as historical views which indicate patterns or summaries where targets have appeared in the past.

The term, "user data" as used herein refers to user information such as user location, FOV and target preference information that is provided by the user's PEVD for the selection and acquisition of target data to be graphically represented to the user in a user-centric view.

The term "target data" as used herein refers to information about targets available for use on a PEVD for the selection and viewing of targets in user-centric views. Target data includes information such as target location (e.g. latitude, longitude, altitude), target type (e.g. aircraft, vessel, bird, . . . ), target attributes (e.g. speed, heading, radar cross-section, target ID, . . . ), target tracks, target photos, target videos, target imagery, date, time, etc.

The term "target vision server" as used herein refers to a server in the nature of computer servers that uses user data received from a PEVD to acquire and return selected target data to the PEVD. The target vision server can take the form of one or more servers or be implemented as a cloud service. It acquires target data from one or more private or public sources of target data available to it, including target information servers.

The term "target information server" as used herein refers to a server in the nature of computer servers that acquires target data from available private and/or public sources including sensors, surveillance systems, third party information systems and services, cooperative reporting and identification systems and services, and computer modeling and tracking systems and services, etc. The target information server provides selected target data to a target vision server upon request. The target information server can take the form of one or more servers or be implemented as a cloud service.

DETAILED DESCRIPTION

A personal electronic target vision system in accordance with the present invention displays targets of interest (TOIs) to one or more users relative to each user's respective location. With a personal electronic vision device (PEVD) carried by a user, targets in the field of view (FOV) of each user are rendered in real-time to the user so that each user can visualize where the targets are relative to himself, with an aspect analogous to how the targets would be seen with the human eye, either directly or via an optical instrument.

The applications for a user-centric, personal target vision system in accordance with the present invention are numerous. In several respects, a super-human, synthetic target vision capability results which assists users in finding TOIs quickly and intuitively, better than they could be found with the unaided or optically aided eye. In homeland security applications, responders gain local awareness and safety by being able to find and focus on targets at long distances and in poor lighting conditions, for example, in maritime environments, where human vision fails. In bird strike prevention applications, wildlife control personnel are assisted in finding hazardous birds of interest that they can respond to. General aviation pilots can use the system to keep tabs on other aircraft in their vicinity especially where air traffic control services are not available. The system can be used on the battlefield to give soldiers situational awareness of enemy movements for their own safety, as coverage is not limited by the user's line of sight. Recreation applications include bird watching (where the system assists you on where to look because it is hard to see birds more than a couple of hundred meters away), animal hunting in the wild, and fishing (where the system alerts you to where other fishing vessels are hanging out).

The system is also useful for cooperative targets. For example, it will work well for highway safety. Cars on the highway can send their GPS locations through satellite (e.g. Onstar) to the target information system in accordance with the present invention. Individual vehicles would then be able to use the PEVD (which can be mounted or integrated into the vehicle) to display other approaching vehicles, with warnings to the driver. AIS vessel location information can also be sent to the target information server in a similar manner. Smaller vessels (who do not carry AIS transponders as they are not required to) can now benefit with an installed PEVD that reports large AIS-carrying vessels nearby. The surveillance system in accordance with the present invention can take full advantage of cooperative target tracking data such as vehicle GPS and vessel AIS as illustrated above.

Finally, the personal target vision system in accordance with the present invention can also be used to display deterministic targets to users on PEVDs. For example, planetary and star trajectory computer models can be used to calculate and send regular location updates to the target information server. These celestial targets can then be displayed on PEVDs just like any other cooperative or uncooperative target. The present invention affords the flexibility to integrate any number and types of targets into the surveillance system and target information server for use by the target vision server and PEVDs.

In FIG. 1, the personal electronic vision system 10 in accordance with this invention is shown, consisting of a surveillance system 11, a target information server 13, a target vision server 16 and the PEVD 17, all as described earlier herein. Surveillance system 11 provides target information to the target information server 13 over a network interface 12. Target information server 13 exchanges information with target vision server 16 also over network interface 15. The PEVD 17 communicates with target vision server 16 over network interface 18. Network interfaces 12, 15 and 18 are standard computer network links known to those skilled in the art, including wired (e.g. CAT5/6, ethernet, fibre, cable, twisted pair, etc) and wireless (e.g. cellular, point-to-point, WiFi, SATCOM) links forming local area networks (LAN) and wide area networks (WAN). Standard networking protocols known to those skilled in the art are preferably used over these links, such as TCP/IP, UDP, HTTP, XML, Web Services, SOAP, etc.

In accordance with the present invention, surveillance system 11 is preferably a wide-area radar network in accordance with U.S. Pat. No. 7,940,206 entitled "Low-cost, High-performance Radar Networks" incorporated herein by reference. In addition, for airborne targets of interest where 3D target tracks (with latitude, longitude and altitude coordinates for each target) are desired, the apparatus and methods described in U.S. Pat. No. 7,864,103 entitled "Device and Method for 3D Height Finding Radar" are incorporated herein by reference and are preferably used in surveillance system 11. Target information server 15 is preferably a radar data server in accordance with U.S. Pat. No. 7,940,206.

As described earlier, PEVD 17 presents a user-centric view to the user, displaying the whereabouts or locations of TOIs present in the dynamic FOV of the user; and sends user data over network interface 18 to target vision server 16 in response to changes in the user's view geometry which impact the user's FOV, as the user moves, turns, sets-range-interval, or zooms. Target vision server 16 queries target information server 13 on behalf of a PEVD to obtain respective TOT location information and returns the selected target data to the PEVD 17. Surveillance system 11 tracks targets in the coverage volume of the surveillance system and provides updates of target locations to target information server 13. PEVD 17 can be a specialized user device or a standard, commercial off-the-shelf (COTS), mobile device such as a smart phone, tablet, ultrabook, laptop, notebook, or other PC device.

Figure 2:
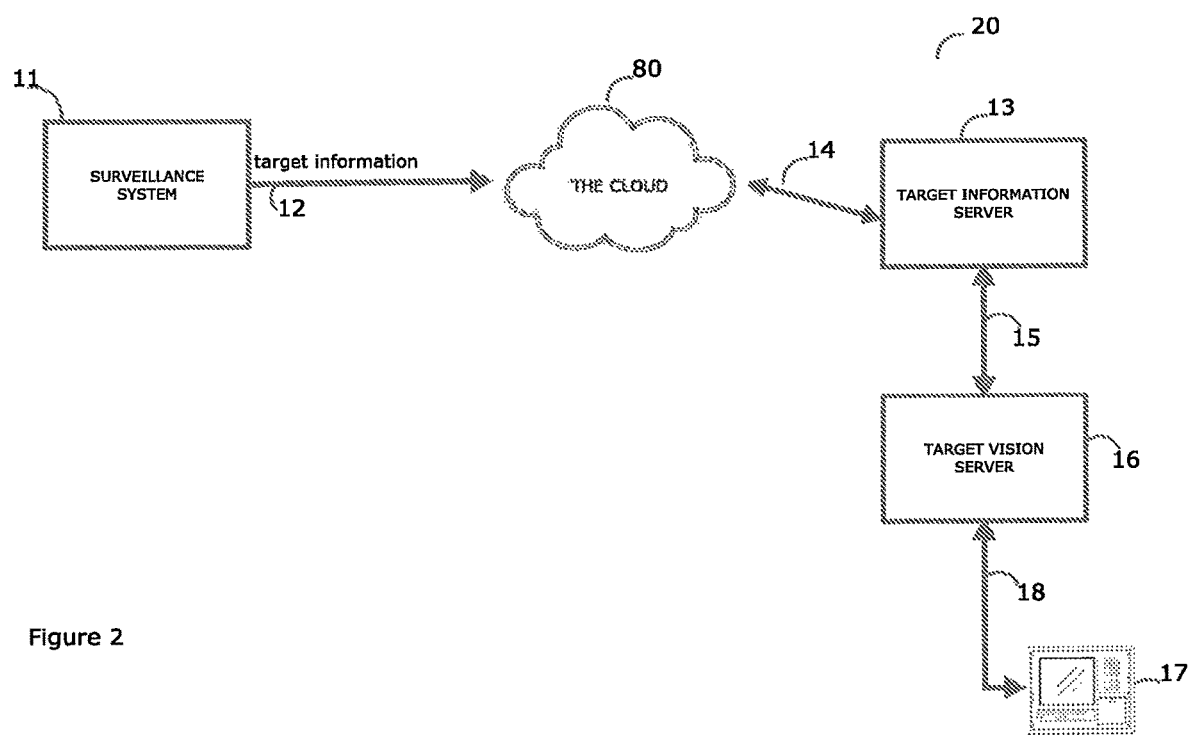
FIG. 2 is a block diagram of another embodiment of the personal, electronic target vision system in accordance with the present invention, where the surveillance system resides in the Cloud.

In FIG. 2, a particular embodiment of a personnel electronic vision system 20 is shown. In this embodiment, surveillance system 11 provides target information over network interface 12 to the Cloud 80. Target information server 13 gains access to target information provided by surveillance system 11 over Internet connection 14 (or a private network link 14 in the case of a private Cloud 80) for use with target vision server 16 and one or more PEVDs 17. As described earlier, and without loss of generality, any of these system elements can be replaced with a multiplicity of them. In all cases, we generally expect a multiplicity of PEVDs. System embodiment 20 is well suited for the case where a surveillance system 11 owner wishes to contribute or make available a target information feed or service to the Cloud 80 for use and exploitation by personal electronic vision system (PEVS) developers or service providers. In this case, the PEVS developers or service providers need only deploy target information server(s) 13 and target vision server(s) 16, along with providing users with PEVDs 17. Recognizing that surveillance system 11 can be a multiplicity of different surveillance systems providing 2D (e.g. for surface targets) or 3D (e.g. for airborne targets) target tracks and related target information (as described above and further below) for uncooperative targets and cooperative targets, target information server 13 preferably includes specialized interfaces or adaptors for each of these surveillance systems 11 while providing a standardized interface between itself and target vision server 16. This approach allows a variety of existing, non-standard, surveillance systems 11 to be easily integrated into a PEVS. The standard interface between target information server 13 and target vision server 16 allows for easy scaling and management of the PEVS system as the number of PEVDs 17 grows.

Figure 3:
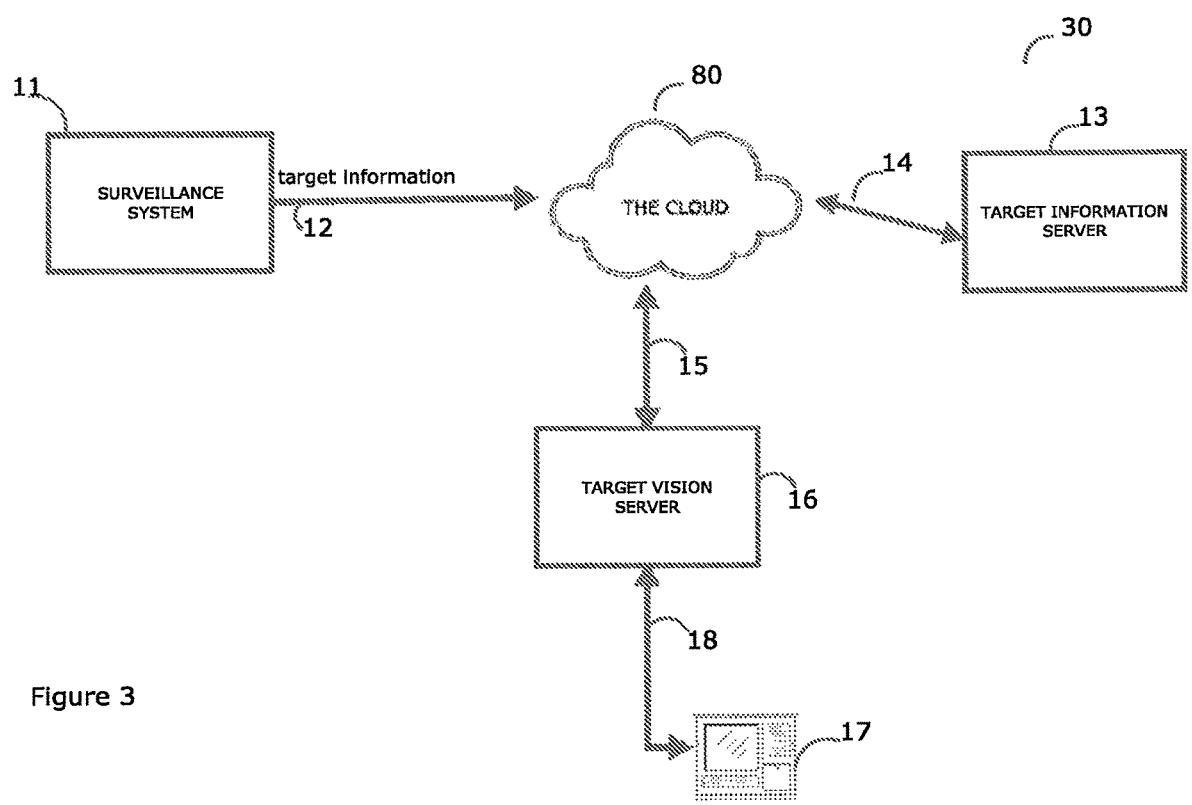
FIG. 3 is a block diagram of an embodiment of the personal, electronic target vision system in accordance with the present invention, where the surveillance system and the target information server reside in the Cloud.

Another embodiment of a PEVS 30 is illustrated in FIG. 3, where now, both surveillance system(s) 11 and target information sever(s) 13 are available via the Cloud 80. In this case, one or more target vision servers 16 access target information as a service from the Cloud 80 over network interface 15, which is preferably the Internet if the Cloud 80 is public. For this embodiment, network interface 15 preferably supports a standardized information interface that give target information server 13 providers the means of easily contributing their services to the PEVS. For this embodiment, a new PEVS service provider can simply deploy target vision server(s) 16 and provide PEVDs 17 to users. Access to the required target information server(s) 13 in accordance with the present invention is preferably by way of third-party service provider agreements which provide metered access to target information in the Cloud 80.

Figure 4:
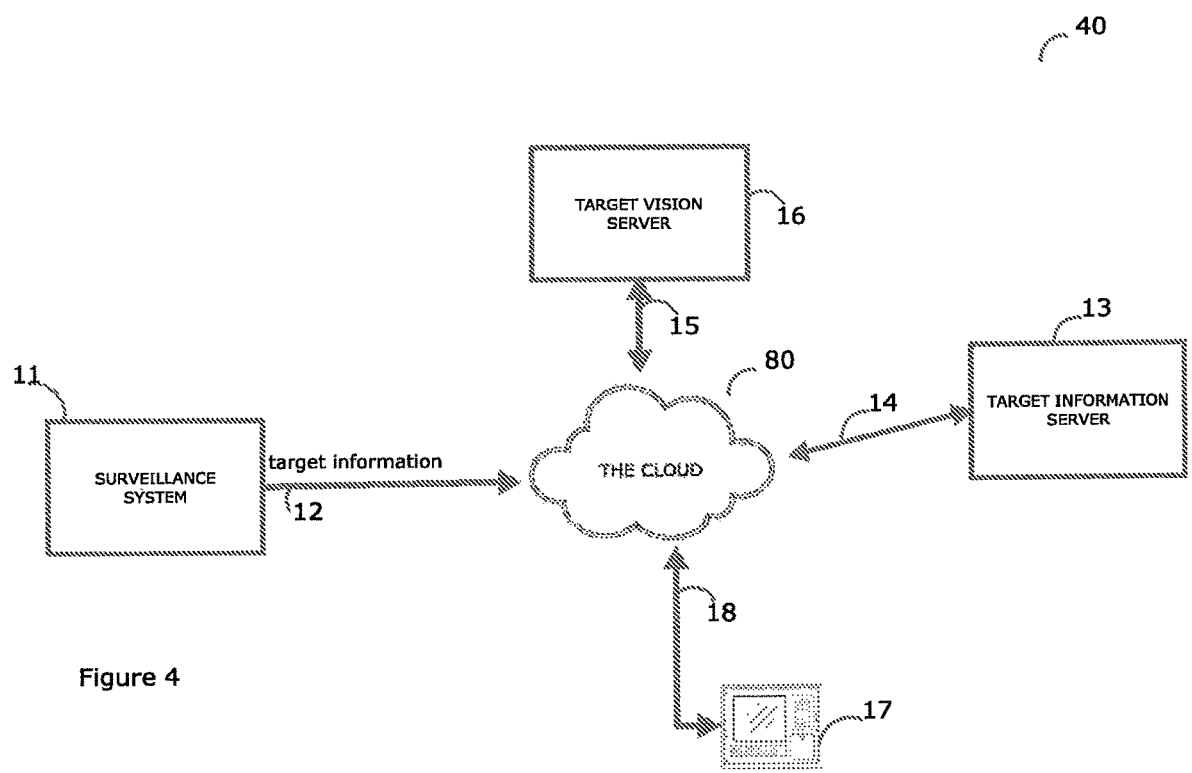
FIG. 4 is a block diagram of an embodiment of the personal, electronic target vision system in accordance with the present invention, where the surveillance system, target information server and target vision server reside in the Cloud.

The PEVS 40 illustrated in FIG. 4 places target vision server(s) 16 in the Cloud 80 as well, so that PEVDs 17 access target data via the Cloud 80, through network interface 18, which is preferably the Internet if the Cloud 80 is public. In this case, PEVD 17 preferably has a standardized information interface to connect to the Cloud 80 for access to real-time and historical target data provided via target vision server(s) 16, in conjunction with target information server(s) 13 and surveillance system(s) 11. For this system configuration, a PEVS user simply needs to acquire a PEVD 17 and subscribe to a service to activate the PEVD 17. In one embodiment, the PEVD 17 is preferably a mobile device such as a smart phone and the PEVS functionality is obtained by downloading a software application and subscribing for the service from a PEVS service provider.

Figure 5:
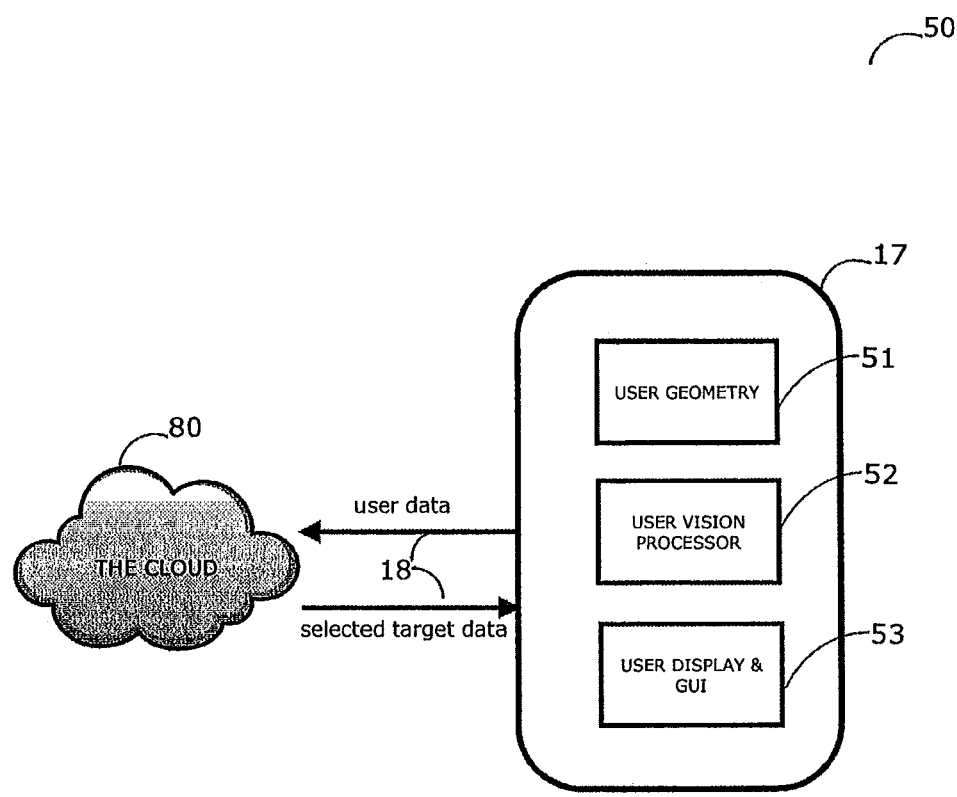
FIG. 5 is a block diagram of a preferred embodiment of the personal electronic vision device in accordance with the present invention connected directly to the Cloud.

FIG. 5 illustrates another preferred embodiment of a PEVS 50 in accordance with the present invention. Features presented in FIG. 5 area equally applicable to other embodiments presented herein. Each PEVD 17 connects to the Cloud 80 over a network interface 18, which is preferably the Internet if the Cloud 80 is public. PEVD 17 preferably has a standardized information interface to connect to the Cloud 80 for access to real-time and historical target data provided via Cloud 80. For this system configuration, a PEVS user simply acquires a PEVD 17 and subscribes to a Cloud 80 service to activate PEVD 17. PEVD 17 is preferably configured to include three elements: a user geometry module 51, a user vision processor 52 and a user display & GUI (graphical user interface) 53. These elements can be clearly defined and separated in PEVD 17, or alternatively, combined and integrated using hardware and software components and methods known to those skilled in the art. User data is sent from PEVD 17 to the Cloud and selected target data is returned from the Cloud 80 to PEVD 17 over network interface 18. Network interface 18 is a standard network known to those skilled in the art, typically made of any combination and number of network segments (not explicitly shown FIG. 5 and earlier figures) including wired segments (e.g. CAT5/6, ethernet, fibre, cable, twisted pair, etc) and/or wireless segments (e.g. cellular such 3G, 4G, LTE, etc, point-to-point, WiFi, SATCOM) forming local area network (LAN) segments and/or wide area network (WAN) segments, including the Internet with all necessary routing to route traffic from PEVD 17 to Cloud 80.

User data includes user location information (i.e. GPS coordinates of PEVD 17, and preferably its heading, speed and acceleration) and user view geometry information (which defines the user's FOV, indicating where the user is looking; i.e. where the user's PEVD is pointed towards) calculated by user geometry module 51. In addition, user data includes user target filtering selector information provided via GUI 53. Using the user data, the PEVS queries the Cloud 80 for relevant target data, obtains and filters as necessary the target data and sends the resulting selected target data to PEVD 17. User vision processor 52 further processes selected target data received from the Cloud as necessary, and renders display video and writes to user display 53. GUI 53 provides the user interface and controls to obtain user input on TOI preferences (i.e. particular targets of interest for rendering on PEVD), FOV definitions (such as set-range-interval, zoom features) and other features and settings (e.g. automatic target locking, user-pan) as described earlier. User interface and controls can be implemented on PEVD 17 using techniques known to those skilled in the art. For example, these can be implemented with specific buttons, dials, keyboards and/or sliders mounted on the exterior of PEVD 17. They can also be built using a touch-screen on user display 53 where the controls change automatically by software running on user vision processor 52, for example, as a function of the task that the user is doing. Where the PEVD is head-mounted (as in FIG. 7), controls could be mounted on the head-gear itself or associated accessories such as a hand-control unit (e.g. joystick) that could be wired to the head-gear or provided with a wireless interface.

Figure 6:
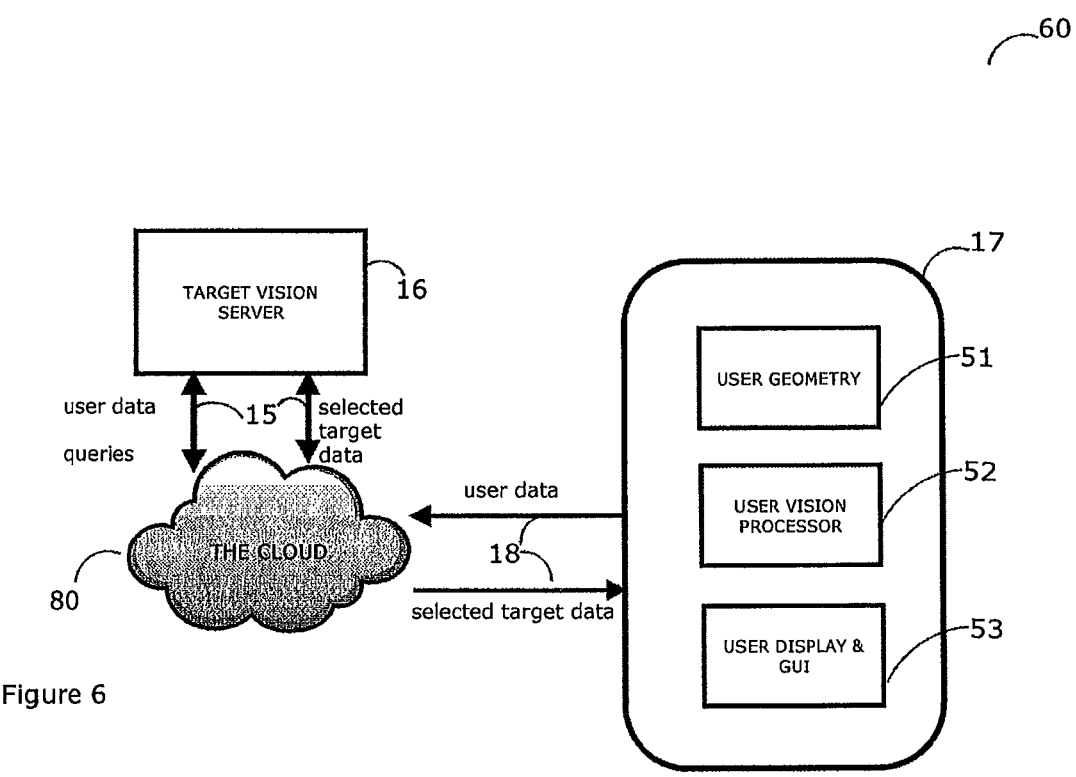
FIG. 6 is a block diagram of a preferred embodiment of the personal electronic vision device and target vision server in accordance with the present invention.

In FIG. 6, PEVS 60 is shown in yet another preferred embodiment. Here, target vision server 16 is present and the behind the scenes (i.e. within the Cloud 80) interaction between PEVD 17 and target vision server 16 are shown. User data originating from PEVD 17 over network interface 18 results in queries sent to target vision server 16 over network interface 15. Selected target data is returned from target vision server 16 over network interface 15 to the Cloud 80, and send on to PEVD 17 over network interface 18.

In one embodiment, the PEVD 17 is preferably a mobile device such as a smart phone and the PEVS functionality is obtained by downloading a software application and subscribing for the service from a PEVS service provider. A user geometry module 51 preferably exploits built-in GPS and accelerometers found on mobile devices. In another embodiment, PEVD 17 is a proprietary device built for carrying by a user, and could come in the form of specialized head-mounted devices or a hand-carried device that is pointed in the direction of interest like a gun or telescope would be pointed.

A preferred feature of the PEVS is the ability for a PEVD 17 to select, request, obtain and display from selected target data in the form of historical target movement patterns in the vicinity of a user. This feature will help a user know where to look for targets based on prior target patterns. This is particularly useful in situations where prior patterns are likely to be repeated, such as bird movement patterns, or vessel or air traffic patterns.

Another feature of the present invention allows the user to specify using PEVD 17 preferred TOIs that the user wishes to be notified of automatically in one or more user-specified FOVs. The monitoring can be done locally by a user vision processor 52, or alternatively, by a PEVS system element external to PEVD 17. In either case, PEVD 17 provides one or more indicators (including audio and video indicators) to the user when such TOIs are present. These indicators draw the user's attention to the situation and assist the user in orienting himself towards the TOIs. For example, left/right and up/down panning arrows or a compass indicator can quickly get the user pointed in the right direction for visual confirmation. Range and zoom indicators can help the user quickly determine the range of the TOIs. With a head-mounted PEVD as illustrated in FIG. 7 and discussed below, the user can quickly get a visual fix on such TOIs.

Various user-centric visual displays can be rendered by PEVD 17. For example, a plan (i.e. 2D) view display projects all targets in the FOV on a map or other image for context. The FOV could be specified as a narrow horizontal (i.e. azimuth) and vertical (i.e. elevation) sector (or sectors) and range-interval, or can be relaxed to full extent in range, 360 deg in azimuth and full hemisphere vertical coverage so all available targets can be viewed. Additional, user-centric FOVs can also be defined. For example, in addition to the forward looking FOV, a user could specify a backwards looking FOV so that he could in effect have eyes in the back of his head. TOIs in such additional FOVs could be displayed in a special area of the PEVDs user display. 3D views can also be rendered, including ones showing TOIs in a realistic-like 3D projection. Identified targets can be displayed with actual target video (i.e. if the target is known, such as a particular vessel), or alternatively, with animated video to create as realistic a view as possible. A target's radar cross-section and dynamics can be used to render different classes of unknown targets (e.g. small craft, cargo vessel, small aircraft, large aircraft). If synthetic aperture radar imagery, inverse synthetic aperture radar imagery, or other sensor imagery is available through the PEVS, it can be sent to the PEVDs as well for display. Additional FOV controls are also optionally provided. For example, the user can zoom/jump to the next nearest target in the FOV, or the fastest target, or slowest target or smallest target in the FOV.

Optionally, earth-views (including Google's Street-View which provides camera-derived, 3D panoramic views of the surroundings) can be integrated into the rendered video so that displayed TOIs can be viewed in their surroundings.

Figure 7:
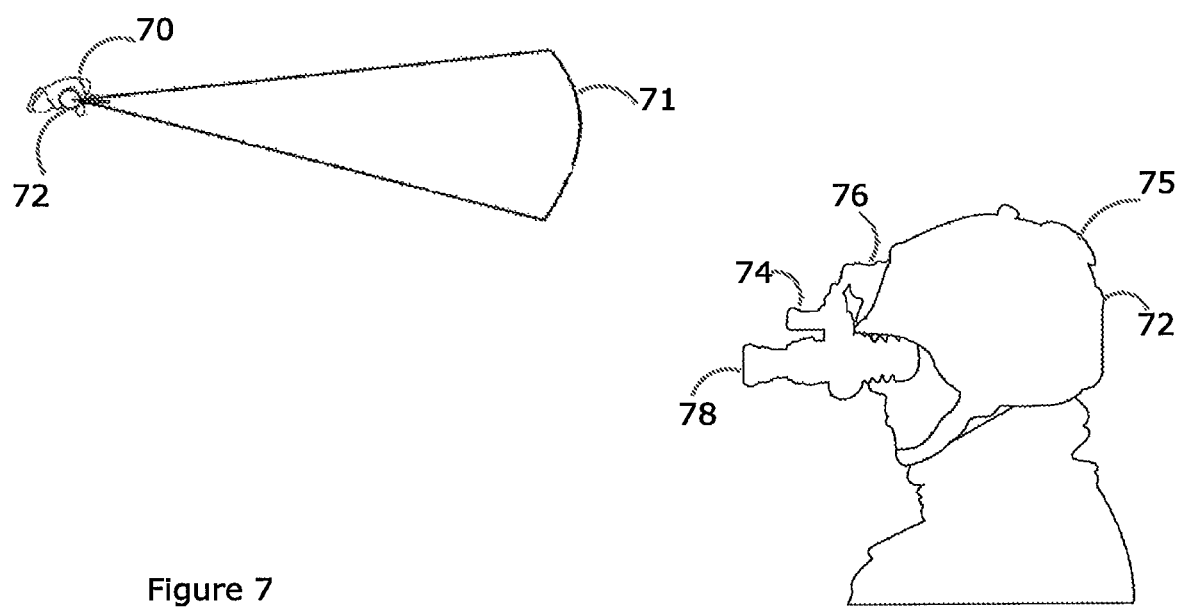
FIG. 7 is a block diagram of a preferred embodiment of the personal electronic vision device in accordance with the present invention where the device is integrated with specialized head gear.

A head-mounted PEVD 72 in accordance with the present invention is illustrated in FIG. 7. It incorporates all features of PEVD 17. FOV 71 is illustrated in the direction where the user (and head-mounted PEVD) is pointed. As the user turns his head, the FOV 71 turns with him so that only TOIs in the FOV are displayed. The user display 74 associated with PEVD 72 is provided in a goggle-like form factor directly in front the eyes, or offset above or below the eyes, allowing the users own eyes, even with the aid of binoculars, to be used in conjunction with user display 74 to find particular TOIs. User display 74 can be a heads-up or projected display on glass that allows the user to see through user display 74. If integrated with binoculars or camera 78, the user can preferably look through binoculars or camera 78 by looking horizontally straight in front of the eyes, and can look at the user display 74 by angling eyes upwards (or downwards in an alternate arrangement), similar to using bifocal glasses. Bearing (azimuth/elevation) or pan (left/right and up/down) indicators on the user display 74 assist the user in visually turning towards any particular selected TOI being displayed in the FOV. User geometry module 76 contains GPS and accelerometers to provide real-time look geometry information, and communications module 75 provides the two-way data communications between PEVD 72 and the rest of the PEVS system.

An optional feature of PEVD 72 is a coupled, high-powered active/passive camera 78 that is head-mounted so that it is directionally synchronized with PEVD 72 and cued by PEVD 72 to zoom to a selected TOI to give the user with a close-up, video view of a TOI. Unlike unassisted cameras or night-vision goggles, PEVD 72 is directed to a TOT automatically by the PEVS.

PEVD 72 could also be used as part of a bionic vision system to restore sight to a blind person with the aid of synthetic target vision in accordance with this invention. Goggle-mounted user display 74 could transmit its video using high-frequency radio signals to a microchip implanted in the retina of a blind person. Electrodes on this implanted chip translate these signals to electrical impulses that stimulate cells in the retina connected to the optic nerve which drive vision processing and image formation in the brain. With such a device, a blind person could actually learn to fly as he could see a user-centric, synthetic and dynamic rendering of the earth environment along with visualization aircraft TOIs in his field of view.

Another feature of the present PEVS is that the interactions between the PEVS and individual PEVDs can be recorded and played back for real world simulations and training. The recording is low-bandwidth and can be done in the Cloud 80, on the target vision server or even on individual PEVDs as the interaction between the PEVD and the Cloud/target vision server is available to both.

Preferably, embodiments of the personal electronic vision system 10, 20, 30 and 40 disclosed herein aim to take advantage of standardized COTS technologies to the maximum extent possible in order to keep the system cost low and to provide for low life cycle costs associated with maintainability, upgrade ability and training. Preferably, COTS surveillance systems 11 are used, or target tracks from existing surveillance systems are leveraged through subscription services to affordably provide the target location data exploited by the present invention. COTS personal computers (PC) are used preferably in relation to the target information servers 13 and target vision servers 16. And PEVDs 17 are preferably COTS mobile devices with built-in GPS, heading, and view-geometry (e.g. using built-in accelerometers) reporting capabilities.

Particular features of our invention have been described herein. However, simple variations and extensions known to those skilled in the art are certainly within the scope and spirit of the present invention. This includes variations on integration of the functional blocks described herein. For instance, user vision processor 52 may be configured for generating alphanumeric messages on user display and GUI 53 that describe various targets rendered on the display. The alphanumeric messages may include, for instance, names for the targets and descriptive particulars including speed, heading, and size, as well as generic designations such as fighter plane, propeller plane, bird, container ship, pleasure craft, heavy truck, man, etc.

It is to be understood that user geometry module 51 and user vision processor 52 may be implemented by hard-wired integrated circuit. Alternatively, user geometry module 51 and user vision processor 52 may be realized in the form of generic microprocessor processing circuits configured by programming to carry out the various functions described herein. As indicated above, the programming may be transmitted in the form of an application program to a personal electronic vision device such as a smart phone. User geometry module 51 and user vision processor 52 serve in part as means for rendering, on user display and GUI 53, targets relative to each user's respective location.

What is claimed is:

1. A personal, electronic target vision system for displaying real-time representations of moving targets to one or more mobile users relative to the dynamic location of each respective user, comprising:

a target information server storing location updates for moving objects in a wide-geographical-area surveillance volume;

one or more sensors operatively connected to said target information server for providing thereto location updates for all moving objects detectible by said one or more sensors in said wide-geographical-area surveillance volume;

a target vision server operatively connected to said target information server for transmitting thereto requests in response to respective target selection information received by said target vision server from one or more personal electronic vision devices, said target information server providing to said target vision server multiple different sets of target location information as to moving objects in said wide-geographical-area surveillance volume selected in response to respective ones of said requests from said target vision server, said target vision server being configured to respond to said personal electronic vision devices with respective ones of said multiple different sets of target location information provided to said target vision server by said target information server in response to the respective target selection information, said respective target location information pertaining at least in part to near-instantaneous or real-time locations of moving objects within a determinable distance of the respective user and within said wide-geographical-area surveillance volume, each of said personal electronic vision devices displaying a respective set of targets on a user-centric display in accordance with a respective one of said multiple different sets of target location information, said respective targets being rendered at respective target locations and continuously and automatically updated without any user intervention in at least approximately real time, so that the display of said respective targets on the personal electronic vision device of said respective user is relative to the dynamic or real-time location of said respective user, where said user's dynamic or real-time location is also updated automatically in accordance with the continuous movement of said user, and said user's location is rendered at the center of said user-centric display.

2. The system in claim 1 wherein said target selection information includes information taken from a group consisting of user location information, user field of view information which includes the forward direction that the user's personal electronic vision device is pointed towards, information characterizing other fields of view of interest to said user, user preference information, and the user's cloud services subscriber information, so that said selected targets are found in the vicinity of said user in accordance with said target selection information.

3. The system in claim 2 where, in accordance with said respective target selection information, said targets are taken from a group consisting of vessels, land vehicles, birds, aircraft, planets, space objects, animals, and people.

4. The system in claim 2 wherein said user location information includes a viewing geometry indicative of an aspect angle and a field of view of interest to the respective user.

5. The system in claim 4 wherein said aspect angle represents a direction vector associated with the forward direction in which said user's personal electronic vision device is pointed towards, and said field of view represents an angular region about said direction vector and a zoom factor associated with a range of interest of the respective user.

6. The system in claim 2 wherein at least one of said personal electronic vision devices is mounted on a mobile platform taken from a group consisting of vehicles, vessels and aircraft, and where the direction that said at least one of said personal electronic vision devices is pointed toward is determined by the orientation of said mobile platform.

7. The system in claim 1 wherein said targets are uncooperative targets.

8. The system in claim 1 wherein said sensors are taken from a group consisting of radars, including airport surveillance radars and national weather radars, and cameras, including daytime and nighttime cameras.

9. The system in claim 1 wherein each of said sensors is a radar, and the sensors together form a wide-area radar network.

10. The system in claim 8 wherein said sensors include 3D radar sensors that provide said target location information.

11. The system in claim 1 wherein said target information server is in the Cloud.

12. The system in claim 1 wherein said target vision server is in the Cloud.

13. The system in claim 1 wherein said personal electronic vision devices include mobile devices taken from a group consisting of smart phones, tablet PCs, PCs, and head-mounted devices.

14. The system in claim 12 wherein said head-mounted devices each include said user-centric display, which is offset from the user's eyes, thereby allowing the respective user to use the personal electronic vision system to direct his eyes to a particular target.

15. The system in claim 1, further comprising said personal electronic vision devices, wherein each said personal electronic vision device, in addition to said user-centric display, includes a user geometry module for continuously calculating the respective user's dynamic field of view, a user vision processor for carrying out the functions of said device and a graphical user interface for obtaining user preferences and providing controls to the respective user to operate the respective personal electronic vision device.

16. The system in claim 15 wherein each said personal electronic vision device is configured for automatically notifying said respective user when a target of interest appears in accordance with said respective target selection information.

17. The system in claim 1 wherein said rendering of said selected target location information on said user-centric display includes visualizations taken from a group consisting of 2D plan views, 3D projection views, target images, target videos, target animations, target remote sensing imagery, and earth-views showing geographic surroundings.

18. The system in claim 1 wherein said personal electronic vision device of said respective user is mounted on a mobile platform taken from a group consisting of vehicles, vessels and aircraft, and where the location information of said respective user is determined by the location of said mobile platform.

19. The system in claim 18 wherein said visualization of said selected targets on said user-centric display locates and orients said selected targets in a North-up configuration.

20. The system in claim 18 wherein said visualization of said selected targets on said user-centric display locates and orients said selected targets in a Forward-up configuration in accordance with said forward direction of said personal electronic vision device.

21. The system in claim 1 wherein said target information server is configured to provide to said target vision server historical target location information as to past movements of objects in said wide-geographical-area surveillance volume selected in response to said requests from said target vision server, said target vision server being configured to provide said historical target location information to said one or more personal electronic vision devices.

22. A method for displaying moving targets to one or more mobile users relative to the dynamic location of each respective user, comprising:

operating a target information server to store location updates for all detectible moving objects in a wide-geographical-area surveillance volume and to provide, to a target vision server, multiple different sets of target location information pertaining to respective selected subsets of said detectible moving objects in response to respective requests from said target vision server;

also operating said target information server to receive location updates from one or more sensors for all moving objects detectible by said one or more sensors in said wide-geographical-area surveillance volume, said one or more sensors being operatively connected to said target information server;

operating said target vision server to receive respective target selection information from one or more personal electronic vision devices and to transmit, to said target information server, said respective requests in response to said respective target selection information;

further operating said target vision server to receive said multiple different sets of target location information from said target information server for targets selected from among all said detectible moving objects in accordance with said respective requests, said multiple different sets of target location information pertaining at least in part to near-instantaneous or real-time locations of moving objects within determinable distances of the respective users and within said wide-geographical-area surveillance volume; and additionally operating said target vision server to respond to said personal electronic vision devices with respective ones of said multiple different sets of target location information provided to said target vision server by said target information server, so that each of said personal electronic vision devices can display respective targets to its associated user on a user-centric display such that said respective targets are rendered at respective target locations and continuously and automatically updated without any user intervention in at least approximately real time and so that the visualization of said respective targets by said associated user is relative to the dynamic location of said associated user, where said associated user's dynamic or real-time location is also updated automatically in accordance with the continuous movement of said associated user, and said associated user's location is rendered at the center of said user-centric display.

23. The method in claim 22 wherein said target selection information includes information taken from a group consisting of user location information, user field of view information which includes the forward direction that the user's personal electronic vision device is pointed towards, information characterizing other fields of view of interest to said user, user preference information, and the user's cloud services subscriber information, so that said selected targets are found in the vicinity of said user in accordance with said target selection information.

24. The method in claim 23 where, in accordance with said respective target selection information, said targets are taken from a group consisting of vessels, land vehicles, birds, aircraft, planets, space objects, animals, and people.

25. The method in claim 24 wherein said user location information includes a viewing geometry indicative of an aspect angle and a field of view of interest to the respective user.

26. The method in claim 25 wherein said aspect angle represents a direction vector associated with the forward direction in which said user's personal electronic vision device is pointed towards, and said field of view represents an angular region about said direction vector and a zoom factor associated with a range of interest of the respective user.

27. The method in claim 24 wherein said targets are uncooperative targets.

28. The method in claim 27 wherein said sensors are taken from a group consisting of radars, including airport surveillance radars and national weather radars, and cameras, including daytime and nighttime cameras.

29. The method in claim 28 wherein said sensors include 3D radar sensors that provide said target location information.

30. The method in claim 24 wherein each of said sensors is a radar, and the set of sensors form a wide-area radar network.

31. The method in claim 23 wherein said target information server is in the Cloud.

32. The method in claim 23 wherein said target vision server is in the Cloud.

33. The method in claim 23 wherein said personal electronic vision devices include mobile devices taken from a group consisting of smart phones, tablet PCs, PCs, and head-mounted devices.

34. The method in claim 33 wherein said head-mounted devices each include said user-centric display, which is offset from the user's eyes, thereby allowing the respective user to use the personal electronic vision system to direct his eyes to a particular target.

35. The method in claim 34, wherein said head-mounted devices each further include integrated binoculars or camera to allow the respective user to more easily find and view video of distant and hard to see targets.

36. The method in claim 35, wherein said video is transmitted to a microchip implanted in the retina of a blind person, allowing said blind person to find and see targets of interest.

37. The method in claim 23 wherein said target location updates are for cooperative targets using cooperative communication devices taken from a group consisting of automatic identification system on vessels, GPS on vehicles and aircraft, RFIDs and satellite tags on birds, and computer models for planets and space objects.

38. The method in claim 23 wherein said personal electronic vision devices include controls to lock onto a particular target to keep the target within the display limits of said user-centric display.

39. The method in claim 23, further comprising operating said personal electronic vision devices, the operating of said personal electronic vision devices including: operating a user geometry module in each of said personal electronic devices to continuously calculate the respective user's dynamic field of view, operating a user vision processor in each of said personal electronic devices to carry out the functions of said device, operating a graphical user interface in each of said personal electronic devices to obtain user preferences and to provide controls to the respective users to operate the respective personal electronic vision devices.

40. The method in claim 39 wherein each said personal electronic vision device is configured for automatically notifying said respective user when a target of interest appears in accordance with said respective target selection information.

41. The method in claim 23 wherein said rendering of said selected target location information on said user-centric display includes visualizations taken from a group consisting of 2D plan views, 3D projection views, target images, target videos, target animations, target remote sensing imagery, and earth-views showing geographic surroundings.

42. The method in claim 23 wherein at least one of said personal electronic vision devices is mounted on a mobile platform taken from a group consisting of vehicles, vessels and aircraft, and where the direction that said at least one of said personal electronic vision devices is pointed toward is determined by the orientation of said mobile platform.

43. The method in claim 23 wherein said personal electronic vision device is mounted on a mobile platform taken from a group consisting of vehicles, vessels and aircraft, and where the said user's location information is determined by the location of said mobile platform.

44. The method in claim 23 wherein said visualization of said selected targets on said user-centric display locates and orients said selected targets in a Forward-up configuration in accordance with said forward direction of said personal electronic vision device.

45. The method in claim 22 wherein said visualization of said selected targets on said user-centric display locates and orients said selected targets in a North-up configuration.

46. The method in claim 22 wherein the operating of said target information server to provide target location information to said target vision server in response to requests from said target vision server includes operating said target information server to provide historical target location information pertaining to past movements of selected ones of said detectible moving objects.

47. A method for displaying moving targets to one or more mobile users relative to the dynamic location of each respective one of said one or more mobile users, comprising:
receiving at a target information server, from one or more sensors operatively connected to said target information server, object location updates for all objects detectible by said one or more sensors and moving in a wide-geographical-area surveillance volume;
operating said target information server to store the object location updates and to provide multiple different sets of target location information to a target vision server in the Cloud in response to respective requests from said target vision server;
accessing said target vision server in the Cloud to receive respective target selection information from one or more personal electronic vision devices and to transmit, to said target information server, said respective requests in response to said respective target selection information;
further accessing said target vision server to receive said multiple different sets of target location information from said target information server for selected targets in accordance with said respective requests, the received multiple different sets of target location information pertaining at least in part to near-instantaneous or real-time locations of moving objects within determinable distances of respective users of said one or more personal electronic vision devices; and
additionally accessing said target vision server to transmit to said personal electronic vision devices respective ones of said multiple different sets of target location information provided to said target vision server by said target information server for respective selected targets, so that each of said personal electronic vision devices can display said respective selected targets to an associated user on a user-centric display such that said respective selected targets are rendered at respective locations and continuously and automatically updated without any user intervention in at least approximately real time so that visualization of said respective selected targets by said associated user is relative to the dynamic location of said associated user, where said associated user's dynamic or real-time location is also updated automatically in accordance with the continuous movement of said associated user, and said associated user's location is rendered at the center of said user-centric display.

48. The method in claim 47 wherein said target selection information includes information taken from a group consisting of user location information, user field of view information which includes the forward direction that the user's personal electronic vision device is pointed towards, information characterizing other fields of view of interest to said user, user preference information, and the user's cloud services subscriber information, so that said selected targets are found in the vicinity of said user in accordance with said target selection information.

49. The method in claim 48 wherein at least one of said personal electronic vision devices is mounted on a mobile platform taken from a group consisting of vehicle, vessel and aircraft, and where the respective user's location information is determined by the location of said mobile platform.

50. The method in claim 47 wherein the location of said respective user includes the look direction or orientation of the personal electronic vision device of said respective user, said look direction or orientation including the horizontal bearing angle of the personal electronic vision device of said respective user.

51. The method in claim 50 wherein said personal electronic vision device is mounted on a mobile platform taken from a group consisting of vehicle, vessel and aircraft, and where said look direction or orientation is determined by the orientation of said mobile platform.

52. A method for displaying representations of moving targets to one or more mobile users, comprising:
accessing a target vision server in the Cloud, the accessing of said target vision server including transferring selection information to said target vision server from one or more personal electronic vision devices, said selection information including locations of said one or more personal electronic vision devices;
inducing said target vision server to formulate an information request in accordance with said selection information and send said information request to a target information server that receives and stores object location updates for all detectible objects moving in a wide-geographical-area surveillance volume;
further inducing said target vision server to receive multiple different sets of target location information transmitted from the target information server in response to said information request and to selectively provide the received multiple different sets of target location information to respective ones of said one or more personal electronic vision devices for display to the respective users of said one or more personal electronic vision devices so that said respective users can visualize target location information relative to the dynamic locations of said respective users, where the dynamic locations of said respective users are updated automatically in accordance with the continuous movement of said respective users, said selected target location information pertaining at least in part to near-instantaneous or real-time locations of moving objects within determinable distances of said respective users.

* * * * *